United States Patent
Yoshida

(10) Patent No.: US 9,571,568 B2
(45) Date of Patent: Feb. 14, 2017

(54) APPARATUS AND METHOD FOR SELECTING A NODE RELAYING DATA COMMUNICATION BETWEEN SERVERS

(71) Applicant: FUJITSU LIMITED, Kawasaki-shi, Kanagawa (JP)

(72) Inventor: Taketoshi Yoshida, Kunitachi (JP)

(73) Assignee: FUJITSU LIMITED, Kawasaki (JP)

(*) Notice: Subject to any disclaimer, the term of this patent is extended or adjusted under 35 U.S.C. 154(b) by 220 days.

(21) Appl. No.: 14/547,431

(22) Filed: Nov. 19, 2014

(65) Prior Publication Data

US 2015/0180982 A1 Jun. 25, 2015

(30) Foreign Application Priority Data

Dec. 19, 2013 (JP) ................................. 2013-262802

(51) Int. Cl.
*G06F 15/16* (2006.01)
*H04L 29/08* (2006.01)

(52) U.S. Cl.
CPC ................................. *H04L 67/101* (2013.01)

(58) Field of Classification Search
CPC ........ H04W 4/028; H04W 4/02; H04W 4/023; H04W 4/043; H04W 4/025; G01S 5/0284; G06F 17/30241; G06F 17/30277; G06F 17/3087; H04L 67/101
See application file for complete search history.

(56) References Cited

U.S. PATENT DOCUMENTS

2004/0246905 A1 12/2004 Dunagan et al.
2009/0323519 A1 12/2009 Pun

FOREIGN PATENT DOCUMENTS

| EP | 1 755 238 | 2/2007 |
|----|-----------|--------|
| JP | 2006-527537 | 11/2006 |
| JP | 2008-5479 | 1/2008 |
| JP | 2009-542109 | 11/2009 |
| WO | WO 2006/001308 | 1/2006 |

*Primary Examiner* — Ryan Jakovac
(74) *Attorney, Agent, or Firm* — Staas & Halsey LLP

(57) ABSTRACT

An apparatus receives, from a management server device, three-dimensional disposition information pertaining to positions of a plurality of server devices each including a wireless communication unit, and converts the three-dimensional disposition information into two-dimensional disposition information. The apparatus calculates, based on the two-dimensional disposition information, a straight line distance indicating a length of a straight line between a first server device in the plurality of server devices and each of second server devices to which the first server device transmits data, and selects, from among the plurality of server devices, a relay server device for relaying data between the first server device and the second server devices, based on the calculated straight line distances.

18 Claims, 13 Drawing Sheets

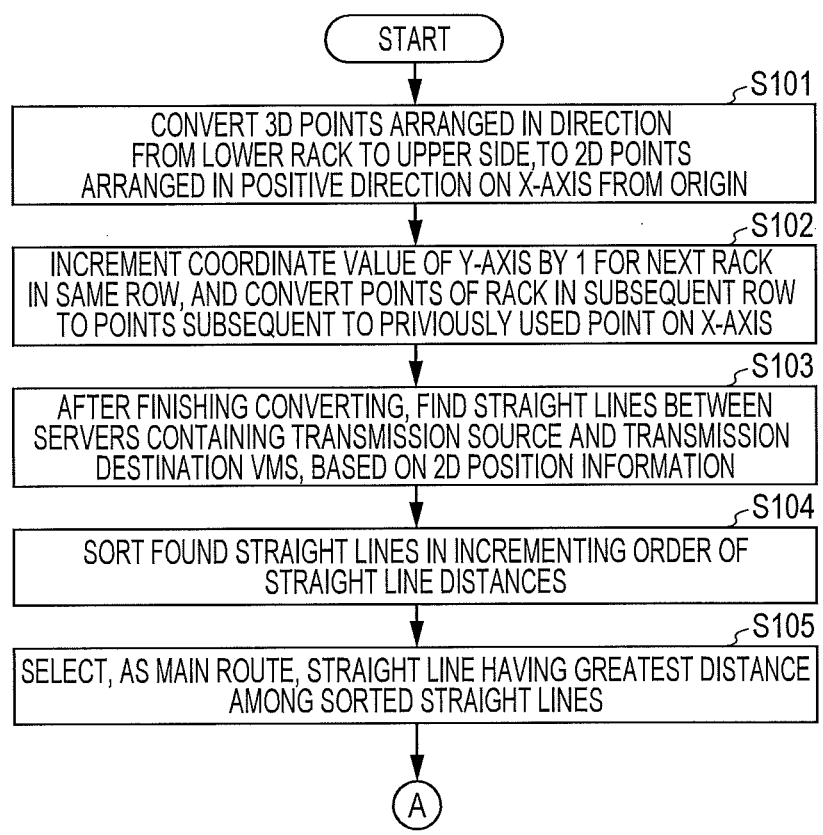

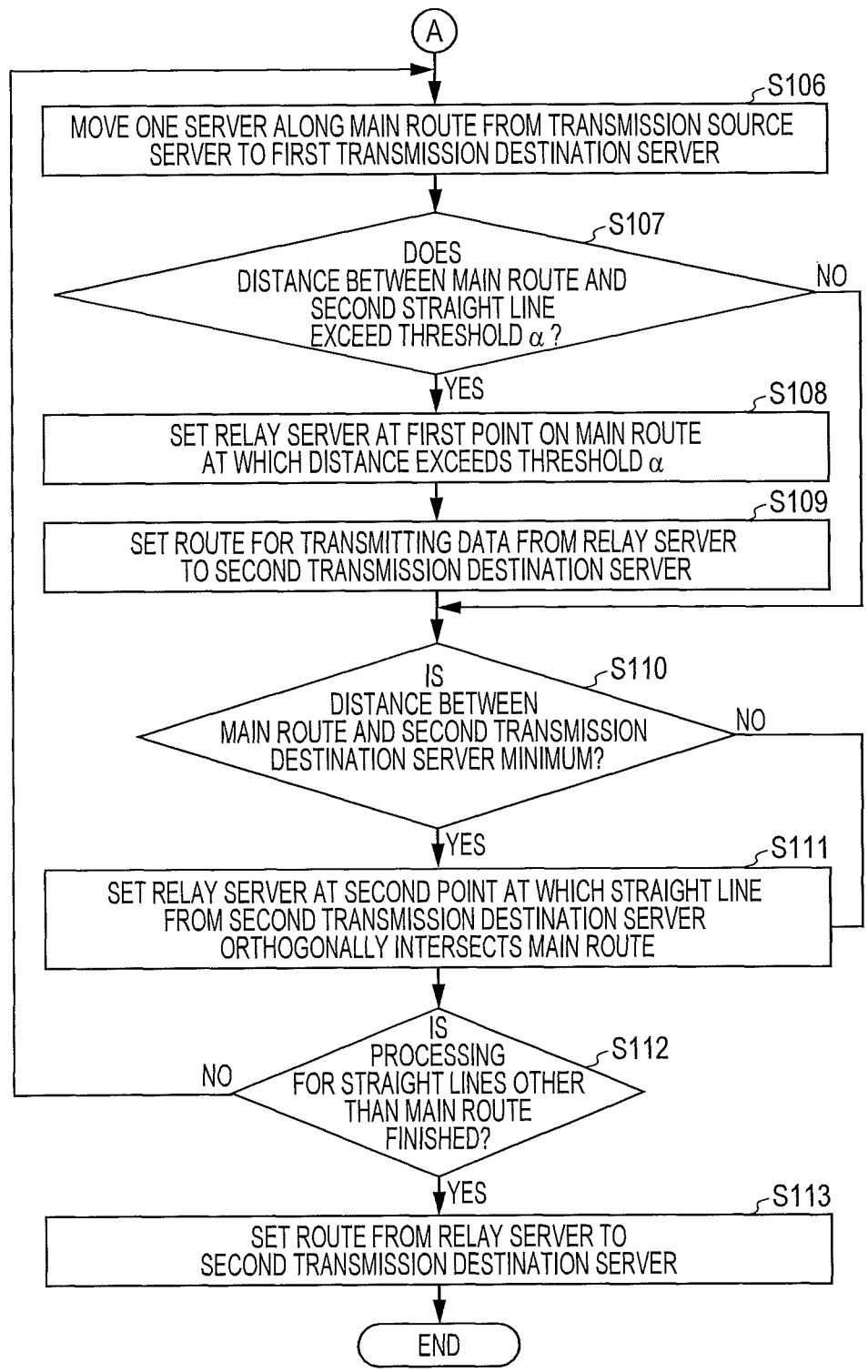

FIG. 9

| SERVER A (TRANSMISSION SOURCE) | SERVER F | SERVER G | SERVER H (RELAY SERVER X) |
|---|---|---|---|
| BANDWIDTH 5 : 100% AVAILABLE | BANDWIDTH 3 : 100% AVAILABLE | BANDWIDTH 3 : 100% AVAILABLE | BANDWIDTH 5 : 100% AVAILABLE |
| BANDWIDTH 3 : 100% AVAILABLE | BANDWIDTH 5 : 100% AVAILABLE | BANDWIDTH 1 : 100% AVAILABLE | BANDWIDTH 3 : 100% AVAILABLE |
| BANDWIDTH 1 : 80% AVAILABLE | BANDWIDTH 1 : 80% AVAILABLE | BANDWIDTH 2 : 80% AVAILABLE | BANDWIDTH 1 : 80% AVAILABLE |
| BANDWIDTH 4 : 30% AVAILABLE | BANDWIDTH 4 : 30% AVAILABLE | BANDWIDTH 5 : 30% AVAILABLE | BANDWIDTH 4 : 30% AVAILABLE |
| BANDWIDTH 2 : 0% AVAILABLE | BANDWIDTH 2 : 0% AVAILABLE | BANDWIDTH 4 : 0% AVAILABLE | BANDWIDTH 2 : 0% AVAILABLE |

FIG. 10

| SERVER A (TRANSMISSION SOURCE) | SERVER F | SERVER G | SERVER H (RELAY SERVER X) |
|---|---|---|---|
| BANDWIDTH 5 : 100% AVAILABLE | BANDWIDTH 3 : 100% AVAILABLE | BANDWIDTH 3 : 90% AVAILABLE | BANDWIDTH 5 : 100% AVAILABLE |
| BANDWIDTH 3 : 100% AVAILABLE | BANDWIDTH 5 : 100% AVAILABLE | BANDWIDTH 1 : 87% AVAILABLE | BANDWIDTH 3 : 100% AVAILABLE |
| BANDWIDTH 1 : 80% AVAILABLE | BANDWIDTH 1 : 80% AVAILABLE | BANDWIDTH 2 : 80% AVAILABLE | BANDWIDTH 1 : 80% AVAILABLE |
| BANDWIDTH 4 : 30% AVAILABLE | BANDWIDTH 4 : 30% AVAILABLE | BANDWIDTH 5 : 30% AVAILABLE | BANDWIDTH 4 : 30% AVAILABLE |
| BANDWIDTH 2 : 0% AVAILABLE | BANDWIDTH 2 : 0% AVAILABLE | BANDWIDTH 4 : 0% AVAILABLE | BANDWIDTH 2 : 0% AVAILABLE |

FIG. 12
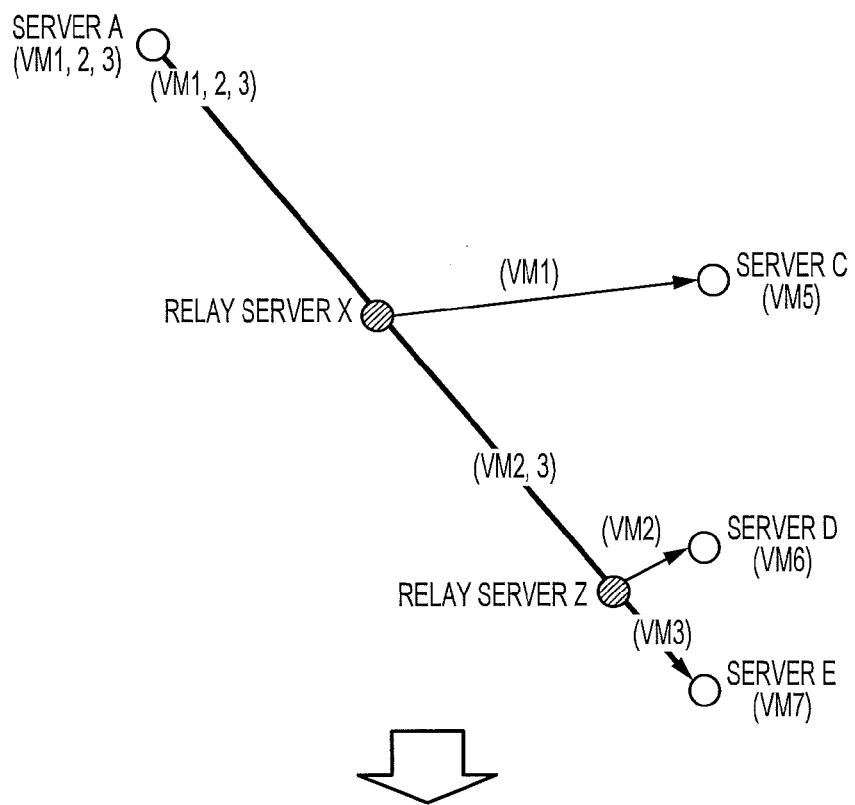
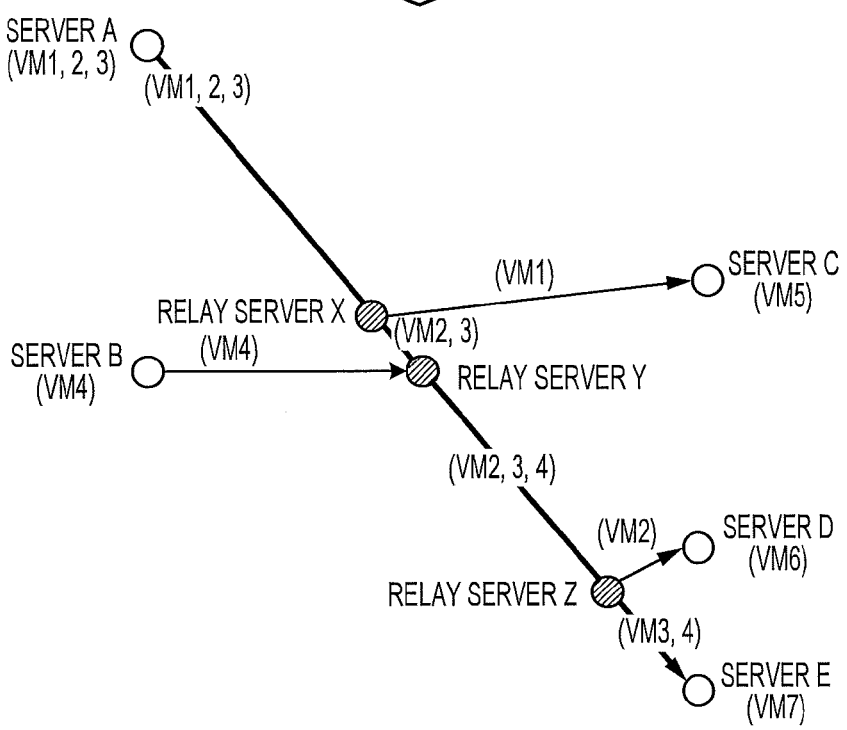

APPARATUS AND METHOD FOR SELECTING A NODE RELAYING DATA COMMUNICATION BETWEEN SERVERS

CROSS-REFERENCE TO RELATED APPLICATION

This application is based upon and claims the benefit of priority from the prior Japanese Patent Application No. 2013-262802, filed on Dec. 19, 2013, the entire contents of which are incorporated herein by reference.

FIELD

The embodiments discussed herein relate to apparatus and method for selecting a node relaying data communication between servers.

BACKGROUND

Conventionally, communication between information processor apparatuses has been carried out by wired or wireless communication. For example, in the case of wired communication, an information processor apparatus transmits data to another information processor apparatus via a layer-2 switch or a layer-3 switch. In the case of wireless communication, an information processor apparatus transmits data to another information processor apparatus via previously fixed relay servers.

International Publication Pamphlet No. WO 2006/001308 discusses the use of a method for relaying data between information processor apparatuses without using a relay server, such as in adhoc communication. For example, data transmitted from the information processor apparatus is relayed between adjacent information processor apparatuses until the data reaches the destination information processor apparatus.

However, if the number of information processor apparatuses for relaying data is high, data transmission with the above technique is not effective since interruptions when relaying the data occur due to data delays and failures.

For example, when a relay server fails, the data relay is interrupted and the data does not reach the destination when carrying out wireless communication via a fixed relay server. In the case of adhoc communication, data delays occur more often as the number of information processor apparatuses for relaying the data increases.

SUMMARY

According to an aspect of the invention, an apparatus receives, from a management server device, three-dimensional disposition information pertaining to positions of a plurality of server devices each including a wireless communication unit, and converts the three-dimensional disposition information into two-dimensional disposition information. The apparatus calculates, based on the two-dimensional disposition information, a straight line distance indicating a length of a straight line between a first server device in the plurality of server devices and each of second server devices to which the first server device transmits data, and selects, from among the plurality of server devices, a relay server device for relaying data between the first server device and the second server devices, based on the calculated straight line distances.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating an example of an operational flowchart, according to a first embodiment;

FIG. 9 is a diagram illustrating an example of determining an available bandwidth, according to an embodiment;

FIG. 10 is a diagram illustrating an example of adjusting available bandwidths, according to an embodiment;

FIG. 12 is a diagram illustrating an example of a communication route, according to a third embodiment.

DESCRIPTION OF EMBODIMENTS

Embodiments of a selecting program for a server device, a selecting method for a server device, and a server selecting device are discussed in detail below with reference to the drawings. The present disclosure is not limited to the embodiments disclosed herein. The embodiments may be combined as appropriate while maintaining consistency.

First Embodiment

Data Center

Figure 1:
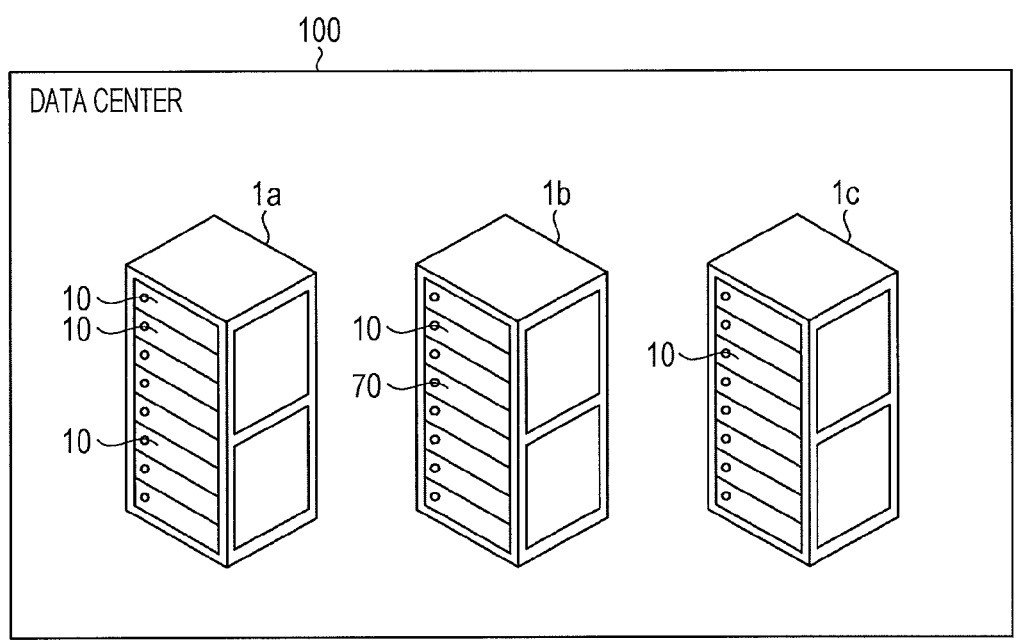
FIG. 1 is a diagram illustrating an example of a data center, according to an embodiment.

FIG. 1 is a diagram illustrating an example of a data center, according to a first embodiment. As illustrated in FIG. 1, a server rack 1a, a server rack 1b, and a server rack 1s are installed in a data center 100. While the following explanation describes an example in which three server racks are installed, the number of racks is not limited and the number may be set or changed as appropriate.

For example, a plurality of servers 10 are mounted in the server rack 1a. A plurality of servers 10 and a management server 70 are mounted in the server rack 1b. A plurality of servers 10 are mounted in the server rack 1c. The number of servers mounted in the server racks and which server rack contains the management server 70 may be changed and set as appropriate.

The servers 10 are rack-mount type servers or blade servers, for example, and are connected to other servers and the management server 70 by wireless transmission.

The management server 70 is a server for managing information of the servers. For example, the management server 70 holds management information that includes identifiers for identifying the servers and position information of the servers. Examples of identifiers include a host name and examples of the position information include a coordinate.

The management server 70 holds information about virtual machines (VM) that operate in the servers. For example, the management server 70 holds internet protocol (IP) addresses of the servers, identifiers for identifying the virtual machines that operate in the servers, and IP addresses of the virtual machines, in association with the servers.

Further, the management server 70 holds bandwidth information for wireless communication used when the servers transmit data. For example, the management server 70 stores bandwidths used by the servers, identifiers for specifying the used bandwidths, and utilization rates of the bandwidths, in association with each other.

(Server Configuration)

Figure 2:
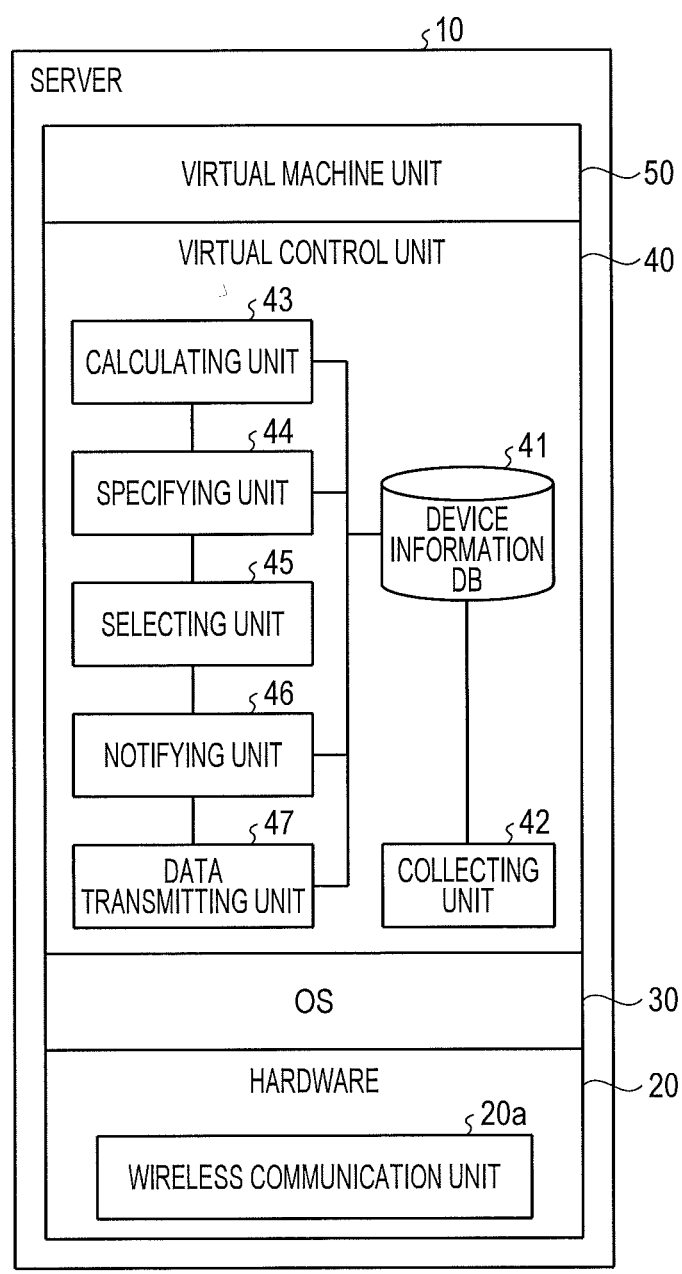
FIG. 2 is a diagram illustrating an example of a hierarchical structure in a server, according to a first embodiment.

FIG. 2 is a diagram illustrating an example of a hierarchical structure in a server, according to a first embodiment. As illustrated in FIG. 2, the server 10 forms a hierarchical structure with hardware 20, an operating system (OS) 30, a virtual control unit 40, and a virtual machine unit 50.

The hardware 20 configures the server 10. The hardware 20 includes a wireless communication unit 20a. The wireless communication unit 20a is an interface for controlling wireless communication with other servers and with the management server 70. The OS 30 is an operating system for executing the server 10 and controls the entire server 10.

The virtual control unit 40 is a processing unit for operating a virtual machine. An example of the virtual control unit 40 is a hypervisor. The virtual control unit 40 includes device information DB 41, a collecting unit 42, a calculating unit 43, a specifying unit 44, a selecting unit 45, a notifying unit 46, and a data transmitting unit 47.

The device information DB 41 is a data base for storing device information of the servers. For example, the device information DB 41 stores the position information, information about the virtual machines, and bandwidth information with regard to the servers 10 in the data center 100.

The collecting unit 42 is a processing unit for obtaining, from the management server 70, the position information of the servers 10 in the data center 100, the information about the virtual machines, and the bandwidth information and storing the information in the device information DB 41. As an example, the timing for collecting the information may be set arbitrarily such as when a data transmission request is initiated, at certain intervals, or when an instruction is received from an administrator.

The calculating unit 43 is a processing unit for calculating straight line distances to servers that represent the destinations of data. Specifically, the calculating unit 43 converts three-dimensional position information of the servers in the data center 100 to two-dimensional position information to calculate the straight line distances from the server 10 to the destination servers.

The specifying unit 44 is a processing unit for specifying a straight line having the longest straight line distance among the straight line distances to the destination servers calculated by the calculating unit 43. The specifying unit 44 further notifies the selecting unit 45 about the information for specifying the destination server corresponding to the specified straight line.

The selecting unit 45 is a processing unit for selecting, from among a plurality of server devices, a relay server device for relaying data communication between more than one server devices, based on the straight line distances calculated by the calculating unit 43. Specifically, the selecting unit 45 is a processing unit for selecting a server positioned on a straight line specified by the specifying unit 44, as a relay point for the data. For example, the selecting unit 45 sets a straight line specified by the specifying unit 44 as a main route. Next, the selecting unit 45 executes the following processing pertaining to straight line routes up to another transmission destination server other than the transmission destination server for the main route.

First, the selecting unit 45 specifies a first point on the main route (a first straight line) whose distance from the server 10 is the same as a distance between the server 10 and a second point positioned on a second straight line from the server 10 (the data transmission source) to another transmission destination server, where a distance between the first and second points exceeds a threshold. The above first point on the main route may be obtained as follows:

1) The selecting unit 45 generates concentric circles having progressively larger diameters centered on the server 10 (the data transmission source); and 2) The selecting unit 45 then specifies a position on the main route at which a distance between a first intersection of the concentric circle and the main route and a second intersection of the concentric circle and a straight line from the server 10 to another transmission destination server exceeds a threshold.

The selecting unit 45, as a method for gradually increasing the concentric circle, selects a server positioned on the main route from the server 10 that is the transmission source to the transmission destination server in increasing order of distance from the server 10 to the server. Next, the selecting unit 45 generates a concentric circle whose radius is the distance from the server 10 to the selected server. When the distance between the first and second intersections does not exceed the threshold, the selecting unit 45 selects a subsequent server and makes a determination in the same way using the concentric circle whose radius is the distance from the server 10 to the selected subsequent server.

The selecting unit 45 specifies a server positioned near the specified position on the main route, based on the two-dimensional position information stored in the device information DB 41. The selecting unit 45 selects the specified server as a relay point for data transmission. That is, the selecting unit 45 selects the specified server on the main route as a relay server for transferring data from the transmission source server to the transmission destination server.

The notifying unit 46 is a processing unit for notifying the server selected as a relay point by the selecting unit 45 about instructions for executing processing as a relay server. Specifically, the notifying unit 46 informs the selected server of data to be transmitted, the destinations of the data, and the bandwidth to be used. The notifying unit 46 allocates a predetermined bandwidth or an unused bandwidth specified from the device information DB 41 to the data.

The data transmitting unit 47 is a processing unit for executing data transmission. Specifically, the data transmitting unit 47 transmits data to be transmitted to the transmission destination server via the server that has been selected by the selecting unit 45 as a relay server.

For example, the data transmitting unit 47 transmits data by using a bandwidth allocated by the notifying unit 46 and by setting the relay point and the receiving server as destinations for the data. The transmitted data is received by the server selected as a relay point, relayed to subsequent relay points, and ultimately received by the transmission destination server.

The virtual machine unit 50 is an operating environment such as a memory region in which a virtual machine is to be executed. One or more virtual machines are executed at the same time by the virtual machine unit 50. The virtual machine unit 50 includes virtual switches for connecting the virtual machines.

Detailed Example

The following is a detailed explanation of processing pertaining to data transmission. Calculating straight line distances, selecting relay servers, and determining transmission routes are described herein.

(Calculation of Straight Line Distances)

Figure 3:
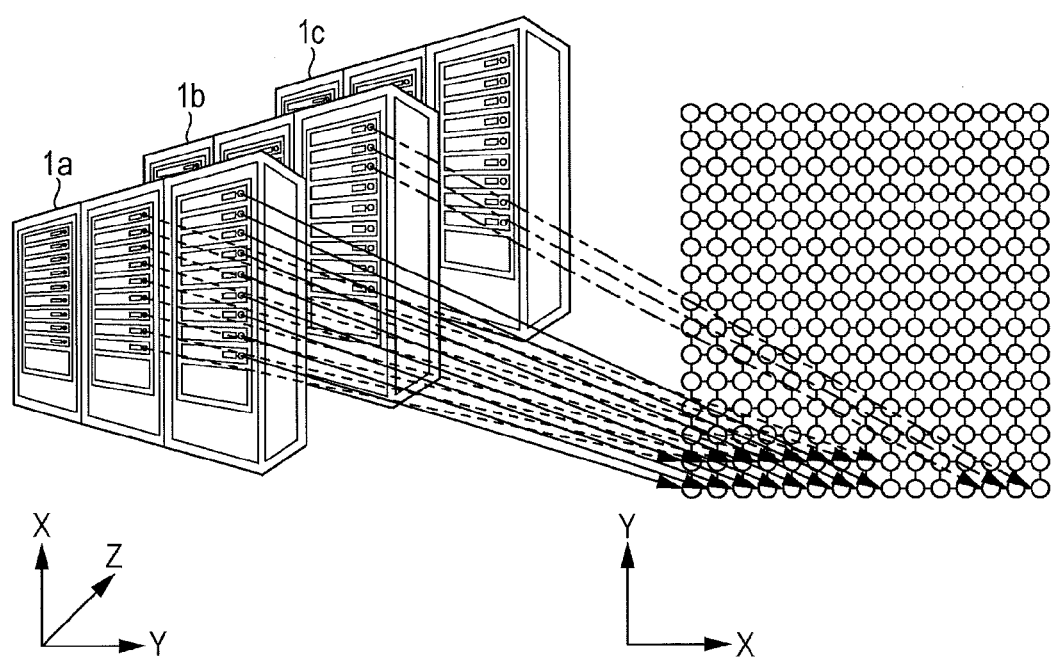
FIG. 3 is a diagram illustrating an example of converting three-dimensional position information to two-dimensional position information, according to an embodiment.

FIG. 3 is a diagram illustrating an example of converting three-dimensional position information to two-dimensional position information, according to an embodiment. As illustrated in FIG. 3, the calculating unit 43 converts three-dimensional information of the servers stored in the device information DB 41 to two-dimensional information. Specifically, the calculating unit 43 sets a coordinate value of the bottommost of the servers mounted on the front rack at 0 on a two-dimensional X-axis and at 0 on a two-dimensional Y-axis. This rack is considered to be the reference rack.

The calculating unit 43 proceeds with the two-dimensional calculations by incrementing a coordinate value of the server mounted above the bottommost servers in the same rack by one for the X-axis while keeping the same value for the Y-axis. When the rack on which the server is mounted is one rack behind the reference rack in a first row, the calculating unit 43 increments a coordinate value of the Y-axis by one and continues the two-dimensional conversion in the same way. Further, when the rack on which the server is mounted changes from the row of the reference rack (the first row), the calculating unit 43 continues the conversion of the three-dimensional coordinate points into the two-dimensional coordinate points by using two-dimensional coordinate points that are on the X-axis and subsequent to the two-dimensional coordinate point that has been lastly used for the first row. The calculating unit 43 stores the two-dimensional data generated in this way in the device information DB 41. The calculating unit 43 may also notify the management server 70 about the two-dimensional data.

(Selecting a Relay Point)

Figure 4:
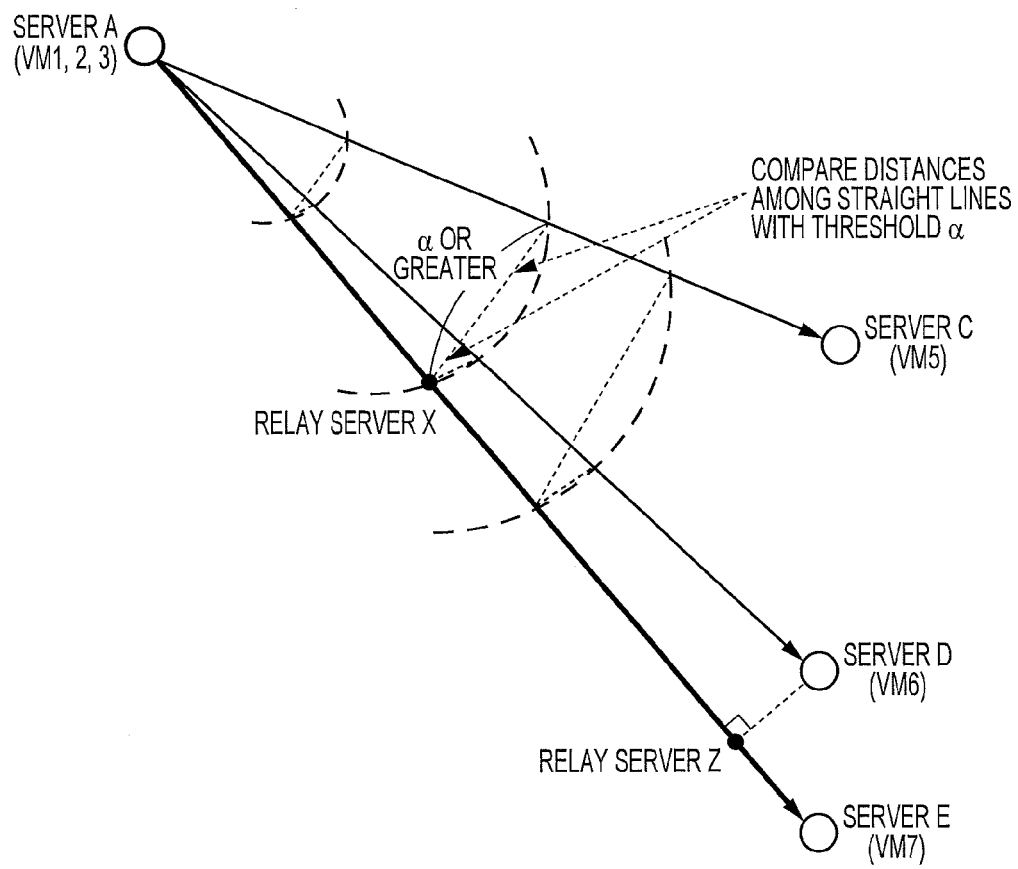
FIG. 4 is a diagram illustrating an example of selecting a relay server, according to an embodiment.

FIG. 4 is a diagram illustrating an example of selecting a relay server, according to an embodiment. The example in FIG. 4 describes a system including a server A, a server C, a server D, and a server E. Each of the servers includes the processing units illustrated in FIG. 2.

The server A operates a VM 1, a VM 2, and a VM 3, the server C operates a VM 5, the server D operates a VM 6, and the server E operates a VM 7.

The VM 1 in the server A transmits data to the VM 5 in the server C, the VM 2 in the server A transmits data to the VM 6 in server D, and the VM 3 in the server A transmits data to the VM 7 in the server E, as described in the example.

In this state, the server A that is the transmission source of the data finds a straight line to the server C, a straight line to the server D, and a straight line to the server E, where the servers C, D, and E are the destinations, and then sorts the straight lines in order of straight line distances. In this case, the server A specifies the straight line from the server A to the server E that has the greatest straight line distance as a main route. That is, the server A specifies a transmission route from the VM 3 to the VM 7 as the main route.

Next, the server A generates concentric circles centered on the server A having increasingly larger diameters according to a predetermined interval. The server A then specifies a position on the main route (a first straight line) at which a distance between a first intersection, at which the first straight line meets the concentric circle, and a second intersection, at which a second straight line from the server A to the server C meets the concentric circle, exceeds a threshold $\alpha$, and selects a server in the vicinity of the specified position as relay server X. Hereinafter, the distance between first and second intersections will be also referred to as "a concentric intersection distance between first and second straight lines" or abbreviated simply as "a distance between first and second straight lines".

Similarly, the server A searches for a position on the main route (the first straight line) at which a concentric intersection distance between a first straight line (the main route) and a second straight line from the server A to the server D exceeds threshold $\alpha$, and determines that there is no position at which the concentric intersection distance exceeds threshold $\alpha$. In this case, the server A selects a server at a point that is on the main route and on a perpendicular line from the server D to the main route, as relay server Z.

(Determination of Transmission Route)

Figure 5:
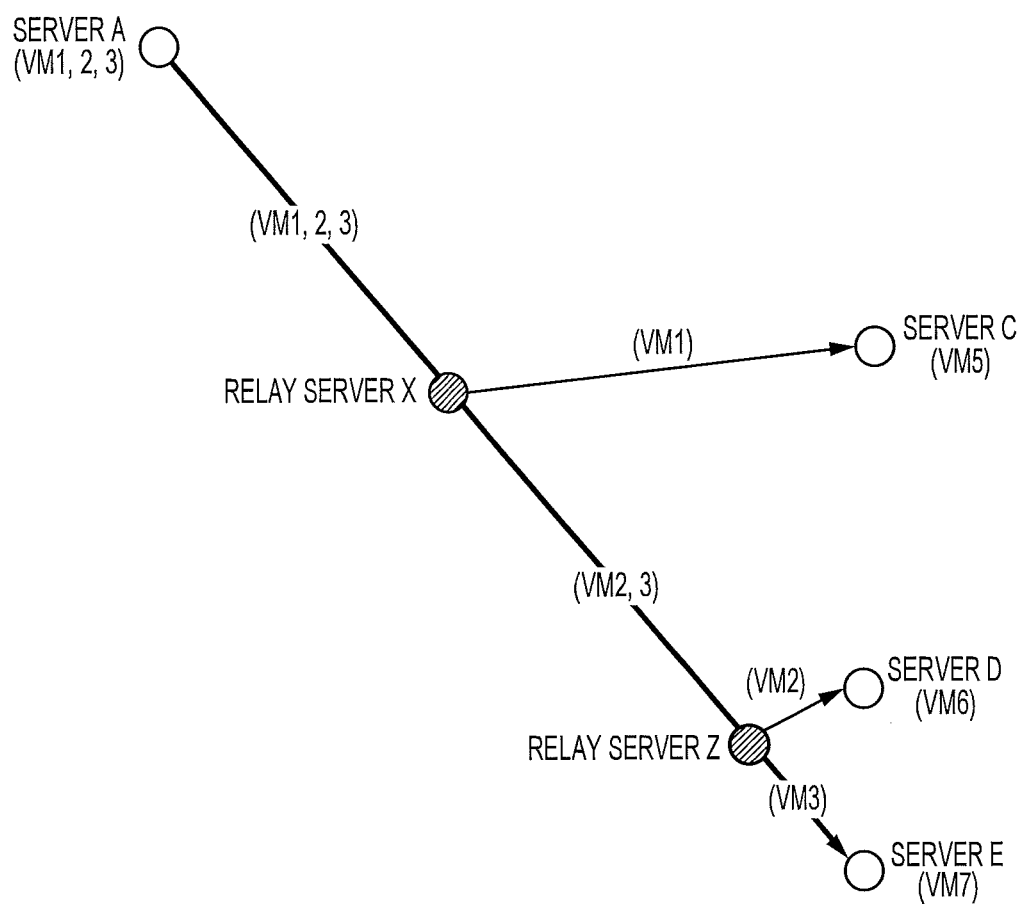
FIG. 5 is a diagram illustrating an example of determining a transmission route, according to an embodiment.

FIG. 5 is a diagram illustrating an example of determining a transmission route, according to an embodiment. The (VM 1, 2, 3) illustrated on a route in FIG. 5 indicates that data from the VM 1, data from the VM 2, and data from the VM 3 are transmitted on the route.

As illustrated in FIG. 5, the server A uses the relay server X and the relay server Z that are selected on the route from the VM 3 to the VM 7 as relay points to transmit the data from the VM 1 to the VM 5, the data from the VM 2 to the VM 6, and the data from the VM 3 to the VM 7.

Specifically, the server A notifies the relay server X and the relay server Z to transmit the data in the same bandwidth. Moreover, the server A transmits to the relay server X an instruction to relay the VM 1 data among received data to the VM 5, and an instruction to relay the VM 2 and VM3 data among received data to the relay server Z.

Further, the server A transmits to the relay server Z an instruction to relay the VM 2 data among received data to the VM 6, and an instruction to relay the VM 3 data among received data to the VM 7.

As a result, the server A transmits data from the VMS 1, 2, and 3 to the relay server X, and the relay server X relays the data from the VM 1 to the VM 5 in the server C, and further transmits the data from the VM 2 and the data from the VM 3 to the relay server Z. The relay server Z relays the VM 2 data among received data to the VM 6 in the server D, and relays the VM 3 data to the VM 7 in the server E.

(Processing Flow)

FIGS. 6A and 6B are diagrams illustrating an example of an operational flowchart, according to a first embodiment. As illustrated in FIG. 6A, the calculating unit 43 of the server 10 converts three-dimensional coordinate points arranged in the direction from the lower rack to the upper side, to two-dimensional coordinate points arranged in the positive direction on the X-axis from a two-dimensional X-axis origin, so as to convert the three-dimensional spatial position information of the servers into two-dimensional position information of the servers (S101).

Next, the calculating unit 43 continues the conversion by incrementing a coordinate value of the Y-axis by one for the next rack in the same row and converts coordinate points of the racks in the subsequent rows to coordinate points that are on the X-axis and subsequent to a two-dimensional coordinate point that has been lastly used for the previous row (S102). After finishing the conversion, the calculating unit 43 then finds straight lines each connecting a pair of servers that respectively include the transmission source and destination VMSs, based on the two-dimensional position information (S103).

The specifying unit 44 sorts the found straight lines in increasing order of straight line distances (S104). The specifying unit 44 then selects, as the main route, a straight line having the greatest straight line distance among the sorted straight lines, where the selected straight line connects a transmission source server and a first transmission destination server (S105).

The selecting unit 45 then moves one server along the main route in the direction from the transmission source server to the first transmission destination server (FIG. 6B, S106). When a concentric intersection distance between the main route and a second straight line from the transmission source server to a second transmission destination server exceeds the threshold α, or falls below the threshold α (S107: Yes), the selecting unit 45 sets a relay server at a first point on the main route at which the concentric intersection distance exceeds the threshold α (S108). Further, the selecting unit 45 sets a route for transmitting data from the set relay server to the second transmission destination server that is positioned on the second straight line beyond the relay server at which the concentric intersection distance has exceeded the threshold α (S109).

When the concentric intersection distance between the main route and the second straight line on which the second transmission destination server is positioned does not exceed the threshold α (S107: No), S110 is executed. When the distance between the main route and the second transmission destination server is minimum (S110: Yes), the selecting unit 45 sets a relay server at a second point at which a straight line from the second transmission destination server orthogonally intersects the main route, or at which the distance between the main route and the second transmission destination server becomes minimum (S111).

When there is a straight line other than the main route for which the processing is not finished (S112: No), the selecting unit 45 returns to S106 and repeats the subsequent processing. Conversely, when the processing for the straight lines other than the main route is finished (S112: Yes), the selecting unit 45 sets routes from the set relay servers to transmission destination servers (S113).

Effects

In this way, a transmission source server is able to execute data transmission by setting a relay server on the main route for each of transmission destinations. Therefore, the number of relay servers required for relaying the data transmitted by the transmission source server may be reduced. As a result, data delays due to data relaying may be suppressed. Moreover, communication traffic may be dynamically distributed to enable smooth communication. Relay station, router functions, and switching functions may be disposed dynamically, thereby avoiding a state in which communication is disabled due to failures of these functions.

Even if a selected relay server has failed, the transmission source server is able to select another server as a relay server by executing the above processing while excluding servers that have failed. Therefore, the transmission source server is able to dynamically select a relay server and is also able to select another server as a relay server when the current relay server has failed. As a result, interruptions in data relay due to failures may be suppressed.

Embodiment 2

While the first embodiment describes an example of transmitting data using the same bandwidth, the embodiments discussed herein are not limited in this way. For example, data may be transmitted by using a different bandwidth for each of the selected relay servers. Accordingly, the second embodiment discusses an example in which data is transmitted by using a different bandwidth for each of the selected relay servers. The configurations of the data center and the virtual machines are the same as those of the first embodiment.

(Server Configuration)

Figure 7:
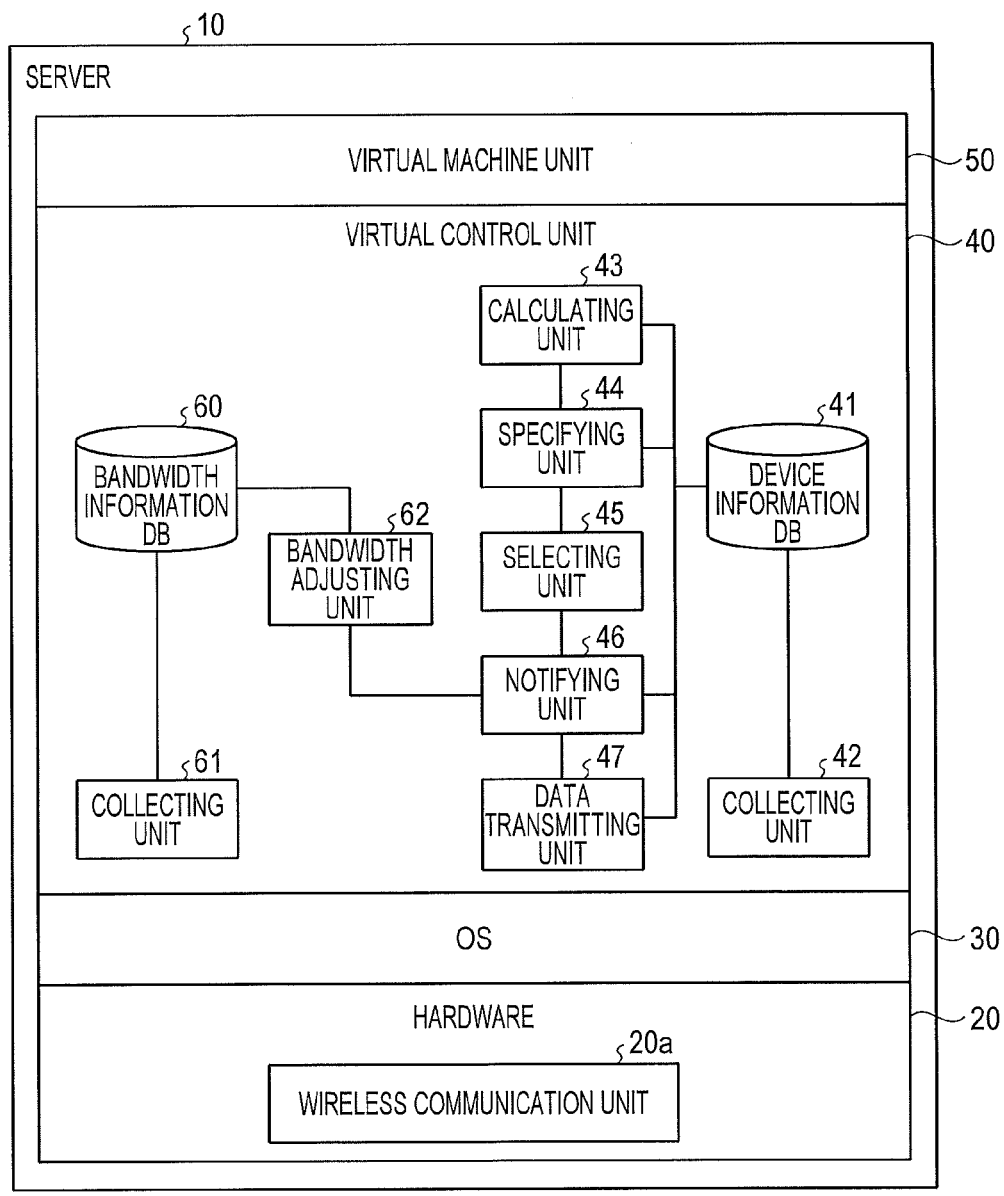
FIG. 7 is a diagram illustrating an example a hierarchical structure in a server, according to a second embodiment.

FIG. 7 is a diagram illustrating an example a hierarchical structure in a server, according to a second embodiment. As illustrated in FIG. 7, the server 10 forms a hierarchical structure including the hardware 20, the OS 30, the virtual control unit 40, and the virtual machine unit 50. The hardware 20, the OS 30, and the virtual machine unit 50 execute processing in the same way as described in the first embodiment and therefore detailed descriptions thereof are omitted.

The virtual control unit 40 includes the device information DB 41, the collecting unit 42, the calculating unit 43, the specifying unit 44, the selecting unit 45, the notifying unit 46, the data transmitting unit 47, a bandwidth information DB 60, a collecting unit 61, and a bandwidth adjusting unit 62. The device information DB 41, the collecting unit 42, the calculating unit 43, the specifying unit 44, the selecting unit 45, the notifying unit 46, and the data transmitting unit 47 are the same as those of the first embodiment and detailed explanations thereof are omitted.

The bandwidth information DB 60 holds bandwidth information for wireless communication used when the servers transmit data. For example, the bandwidth information DB 60 stores a bandwidth used by each of the servers in the data center 100, an identifier for specifying the used bandwidth, and a utilization rate of the bandwidth, in association with each other.

The collecting unit 61 is a processing unit for obtaining bandwidth information from the management server 70 and storing the bandwidth information in the bandwidth information DB 60. Timing for collecting may be set arbitrarily such as when a data transmission request is initiated, at certain intervals, or when an instruction is received from an administrator.

The bandwidth adjusting unit 62 is a processing unit for adjusting the bandwidths used by the relay servers. Specifically, the bandwidth adjusting unit 62 specifies bandwidth usage efficiencies in route segments from the server 10 to the relay servers and allocates the bandwidths having the lowest utilization rates to the relay servers. The bandwidth adjusting unit 62 further notifies the other servers in the data center 100 not to use the allocated bandwidth.

The bandwidth adjusting unit 62 further requests other servers not involved in data transmission to release bandwidths when there exist no bandwidth having the lowest utilization rates (for example, a utilization rate of 0%). The bandwidth adjusting unit 62 may allocate the released bandwidths to the relay servers.

Detailed Example

Figure 8:
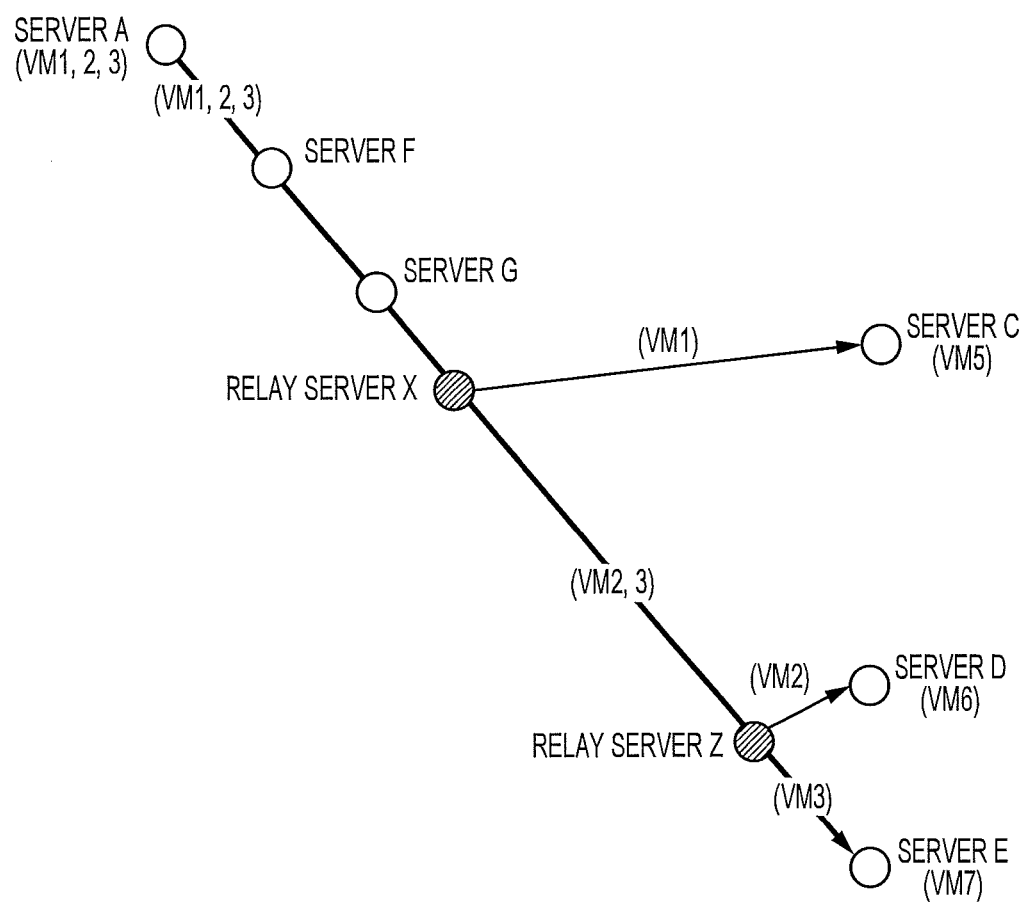
FIG. 8 is a diagram illustrating an example of a communication route, according to a second embodiment.

FIG. 8 is a diagram illustrating an example of a communication route, according to a second embodiment. FIG. 8 illustrates the same communication route determined in the first embodiment. The difference with the first embodiment is that a server F and a server G are present between the server A and the relay server X. The server F and the server G are positioned on the route from the server A to the server E. An explanation of bandwidth control in this state will be given with reference to FIGS. 9 and 10.

(Bandwidth Determination)

FIG. 9 is a diagram illustrating an example of determining an available bandwidth, according to an embodiment. As illustrated in FIG. 9, the server A that is the transmission source obtains, from the management server 70, bandwidth information of the server A, bandwidth information of a server H serving as the relay server X that is the destination, and bandwidth information of the server F and the server G positioned on the route.

In this case, bandwidths 1 to 5 are usable within the route section from the server A to the server H. The server A determines for the server A that bandwidth 1 is 80% available, bandwidth 2 has no availability, bandwidth 3 is 100% available, bandwidth 4 is 30% available, and bandwidth 5 is 100% available.

Similarly, the server A determines for the server F that bandwidth 1 is 80% available, bandwidth 2 has no availability, bandwidth 3 is 100% available, bandwidth 4 is 30% available, and bandwidth 5 is 100% available.

Similarly, the server A determines for the server G that bandwidth 1 is 100% available, bandwidth 2 is 80% available, bandwidth 3 is 100% available, bandwidth 4 has no availability, and bandwidth 5 is 30% available.

Similarly, the server A determines for the server H that bandwidth 1 is 80% available, bandwidth 2 has no availability, bandwidth 3 is 100% available, bandwidth 4 is 30% available, and bandwidth 5 is 100% available.

According to the above results, the server A determines that the bandwidth 3 is available in the route section between the server A and the server H (relay server X). Therefore, the server A notifies the relay server X to transmit the data using the bandwidth 3, and notifies the server F and the server G not to use the bandwidth 3. The server A then transmits the data to the relay server X using the bandwidth 3.

The server A executes the above processing for the route sections between the relay servers and determines bandwidths to be used for relaying data between the relay servers. At this time, the server A takes into consideration the bandwidths allocated to other relay servers when other relay servers are present between the server A and the relay server. For example, when the bandwidth to be used between the server A and the relay server Z in FIG. 8 is determined, the server A considers the bandwidth usage conditions of the server A, the server F, the server G, the relay server X, and the relay server Z. That is, the server A excludes the bandwidths to be used between the server A and the relay server X that have been previously determined, from the bandwidths to be used by the relay server Z.

(Bandwidth Adjustment)

FIG. 10 is a diagram illustrating an example of adjusting available bandwidths, according to an embodiment. As illustrated in FIG. 10, the server A that is the transmission source obtains from the management server 70 bandwidth information of the server A, bandwidth information of the server H serving as the relay server X that is the destination, and bandwidth information of the server F and the server G present on the route.

In this case, bandwidths 1 to 5 are usable within the route section from the server A to the server H. The server A determines for the server A that bandwidth 1 is 80% available, bandwidth 2 has no availability, bandwidth 3 is 100% available, bandwidth 4 is 30% available, and bandwidth 5 is 100% available.

Similarly, the server A determines for the server F that bandwidth 1 is 80% available, bandwidth 2 has no availability, bandwidth 3 is 100% available, bandwidth 4 is 30% available, and bandwidth 5 is 100% available.

Similarly, the server A determines for the server G that bandwidth 1 is 87% available, band 2 is 80% available, band 3 is 90% available, band 4 has no availability, and bandwidth 5 is 30% available.

Similarly, the server A determines for the server H that bandwidth 1 is 80% available, bandwidth 2 has no availability, bandwidth 3 is 100% available, bandwidth 4 is 30% available, and bandwidth 5 is 100% available.

According to the above results, the server A determines that the bandwidth 3 has the highest availability rate in the route section between the server A and the server H (relay server X). However, the server A requests the server G to release the bandwidth 3 since the availability rate of the bandwidth 3 in the server G is not 100%.

The server A notifies the relay server X to transmit the data using the bandwidth 3, and notifies the server F and the server G not to use the bandwidth 3. The server A then transmits the data using the bandwidth 3. Similar to FIG. 9, the server A executes the above processing for each of the route sections between the relay servers and determines the bandwidths to be used for relaying data between the relay servers.

(Processing Flow)

Figure 11:
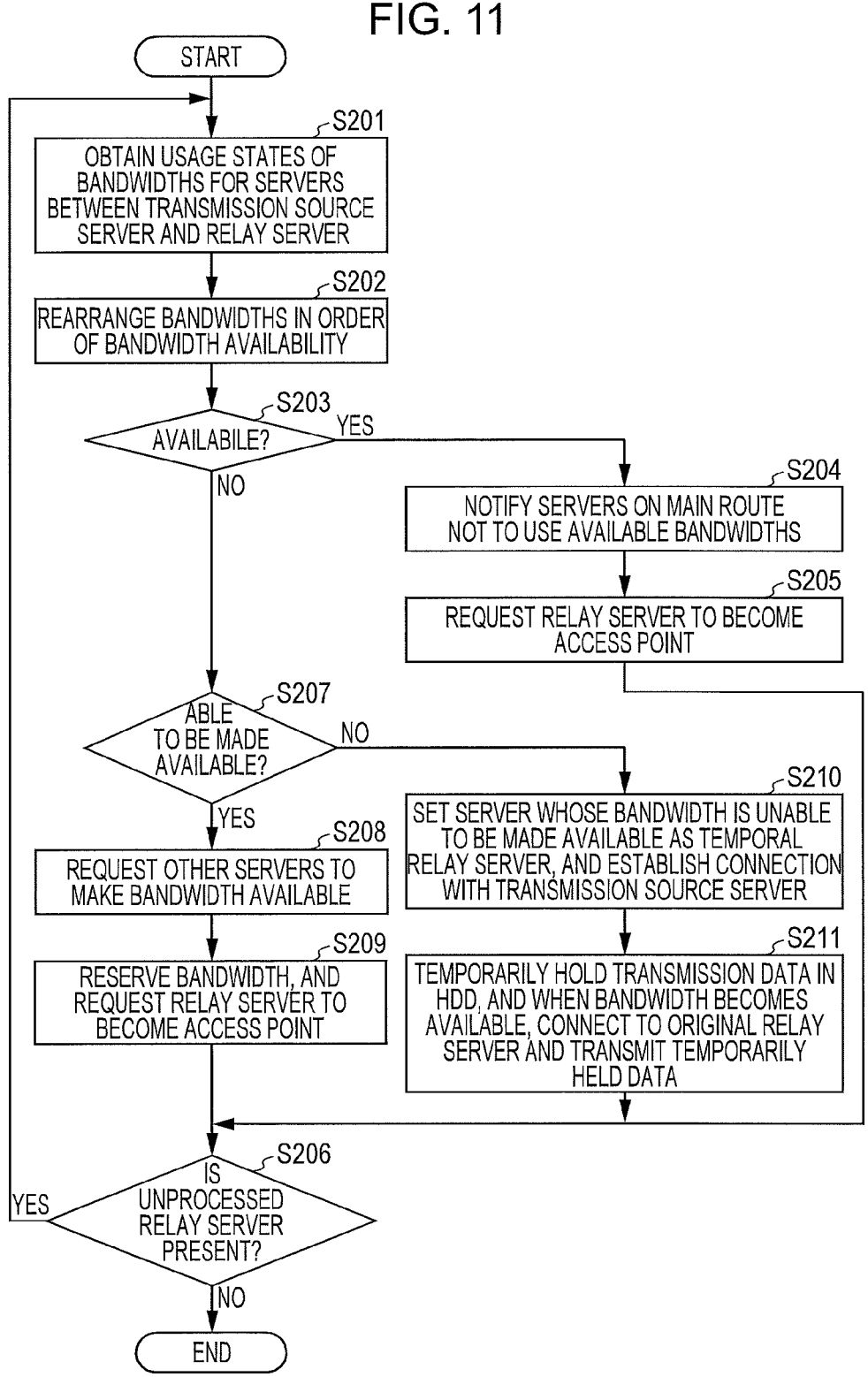
FIG. 11 is a diagram illustrating an example of an operational flowchart, according to a second embodiment.

FIG. 11 is a diagram illustrating an example of an operational flowchart, according to a second embodiment. The following example describes the server 0 as the data transmission source.

As illustrated in FIG. 11, the bandwidth adjusting unit 62 of the server 10 obtains usage states of wireless bandwidths for servers on the main route between the transmission source server 10 and the relay server (S201). The selected relay server is a relay server at a position nearest the server 10 among relay servers on which the processing of FIG. 11 has not been performed yet.

The bandwidth adjusting unit 62 then rearranges the obtained wireless bandwidths of the servers in order of bandwidth availability (S202). The bandwidth adjusting unit 62 then determines whether there are available bandwidths between the server 10 and the relay server (S203).

When there is an available bandwidth (S203: Yes), the bandwidth adjusting unit 62 notifies the servers on the main route not to use the available bandwidth between the server 10 and the relay server (S204).

The notifying unit 46 then requests the relay server to become an access point and establish a connection thereto (S205). At this time, the notifying unit 46 notifies the relay servers about the data to be transmitted, destination information, and the available bandwidths whose usage is restricted for other servers. The bandwidth adjusting unit 62 then determines whether any unprocessed relay servers are present (S206). When an unprocessed relay server is present (S206: Yes), the bandwidth adjusting unit 62 executes S201, and when there is no unprocessed relay server left (S206: No), the processing is finished.

Meanwhile, when there is no available bandwidth (S203: No), the bandwidth adjusting unit 62 determines whether a bandwidth having the highest availability among bandwidths in the route section from the server 10 to the relay server is able to be made available (S207). Specifically, the bandwidth adjusting unit 62 inquires of each of the servers whether a bandwidth is able to be made available. As another example, the bandwidth adjusting unit 62 obtains, from the management server 70, a priority level of the data that are being transmitted using the bandwidth, and determines that a bandwidth is unable to be made available when the priority level is equal to or greater than a predetermined level.

When the bandwidth adjusting unit 62 determines that a bandwidth is able to be made available (S207: Yes), the bandwidth adjusting unit 62 request each of the servers on the main route to make the bandwidth available (S208). The bandwidth adjusting unit 62 then reserves the usage of the bandwidth, and the notifying unit 46 requests the relay server to become the access point and then establish connection thereto when it is confirmed that the bandwidth has been made available (S209). At this time, the notifying unit 46 notifies the relay servers about the data to be transmitted, destination information, and the bandwidths whose usage is restricted for the other servers. Thereafter S206 is executed.

Meanwhile, when it is determined that the bandwidth is unable to be made available (S207: No), the bandwidth adjusting unit 62 selects a server that is unable to make the bandwidth available, designates the selected server as a temporal relay server, and connects to the transmission source server (S210).

The bandwidth adjusting unit 62 then temporarily saves the transmission data, and as soon as the bandwidth becomes available, the bandwidth adjusting unit 62 connects to the original relay server and transmits the temporarily saved data using the available bandwidth (S211).

Effects

In this way, the server 10 is able to suppress the occurrence of data delays and communication interruptions due to interference since the data transmission is executed by using an available bandwidth. Even if no bandwidth is available, the server 10 is able to execute data transmission using a bandwidth after requesting other servers to make the desired bandwidth available.

Even when a bandwidth is not made available by the other servers, the server 10 temporarily saves the data until a bandwidth becomes available, thereby suppressing the occurrence of data transmission errors. While the server 10 requests another server to make a bandwidth available when no bandwidth is available, any bandwidth such as the bandwidth with the lowest utilization rate or the bandwidth with the highest bandwidth may be selected.

Embodiment 3

In a case where, after a main route for transmission of first data from a first transmission source server to a destination transmission server has been determined in the first embodiment, when transmission of second data from a second transmission source server to the same transmission destination server occurs, a new relay server may be set on the previously determined main route and both the first and second data may be transmitted together to the same transmission server via the main route.

Accordingly, the third embodiment describes an example in which data is transmitted from a different transmission source to the same destination. FIG. 12 is a diagram illustrating an example of a communication route, according to a third embodiment. The upper part of FIG. 12 illustrates a state in which routes from the server A to the server E are determined as a main route according to the first embodiment.

Description will be given to an example in which the VM 4 operating in the server B transmits data to the VM 7 in the server E in the above state. As illustrated in the lower part of FIG. 12, since the server B is a transmission source, the server B executes processing similar to that in the first embodiment.

Specifically, the server B sets, as a route, a straight line to the server E that is the destination. The server B then creates concentric circles centered on the server B and selects, as a relay server Y, a server at a point on the main route of the server A where the distance between a first intersection of the main route of the server A and the concentric circle and a second intersection of a second straight line of the server B and the concentric circle falls below threshold α. In the third embodiment, instead of the determination of S108 of FIG. 6B in the first embodiment, a determination of whether distance between the main route and a second straight line falls below threshold α is performed.

The server B then transmits the VM 4 data to the VM 7 via the relay server Y that has been selected as a relay point on the main route from the VM 3 to the VM 7. Specifically, the server B notifies the relay server Y to transmit the VM 4 data on the same band as other data. That is, the server B transmits, to the relay server Y, an instruction to cause the relay server Y to, upon receiving data destined for the VM 7, include the VM 4 data in the received data and to transmit the data to the relay server Z, and transmits, to the relay server Z, an instruction to cause the relay server Z to transmit the VM 4 data to the VM 7.

In this way, when a second transmission source server is different from a first transmission source server but a transmission destination server is the same, the second transmission source server control transmission of second data so that the second data are put on a point on the previously determined main route when a deviation (for example, a concentric intersection distance) between the previously determined main route and a straight line between the second transmission source server and the transmission destination server fall below a fixed value. Therefore, the number of bandwidths to be used may be reduced and congestion through the network may be suppressed.

Embodiment 4

The present disclosure may be implemented in various modes other than the embodiments of the present disclosure described above. The following describes another embodiment.

(Data Center)

The embodiments are not limited to the data center exemplified in the above embodiments. For example, the embodiments may be applied to a wireless network such as a smart meter or applied to a general system. While servers are described as an example in the above embodiment, the embodiments are not limited as such and the embodiments may be applied to a terminal with wireless communication capability such as a smartphone.

(Wireless Device)

While the above embodiments describe examples in which a transmission source server determines a route and adjusts bandwidths for radio waves, the embodiments are not limited as such, and the management server 70 for example may perform the determining and adjusting and then notify the servers of related information.

(Control by QoS)

For example, a transmission source server may execute bandwidth control according to a VM quality of service (QoS) demand level. It is assumed in FIG. 5 that the decreasing order of QoS demand levels is VM 1>VM 2>VM 3. At this time, when the server A has, as bandwidths for the relay server X, only bandwidth needed for the VM 1 and the VM 2, a route is set so that VM 3 data is transmitted via another wireless network interface card (NIC) mounted in the server A.

In the case, when no wireless NIC is available, the server A requests a connected server having a NIC that uses the bandwidth with the lowest utilization rate to transfer the VM 3 data. For example, when the QoS of the VM 1 to the VM 3 is set as the highest and there is an amount of data that is not transmitted in the same bandwidth in FIG. 5, wireless NICs that use bandwidths in which the usage amounts are low among the other wireless NICs are allocated for use of the VM 1 to the VM 3 with respect to the data that is not transmitted in that bandwidth. At this time, the server A determines a route in the same way as in the first embodiment and controls the wireless bandwidths in the same way as in the second embodiment to transmit the data.

(Optimization of Relay Servers)

For example, a transmission source server is able to optimize the load of a central processing unit (CPU) in a server that acts as a relay server, and optimize the disposition of relay servers when the distance between the relay servers is significantly small.

When the CPU load of a server set as a relay server is not enough to take on the role of a relay server, the server A selects a server that is able to take on the role of the relay server from among servers physically adjacent to the initially set relay server. When no such server is found, the server A further increases the distance and, if possible, selects, as a new relay server, a server from among servers on the main route.

Moreover, when a distance between relay servers is less than a predetermined value and the relay servers are near each other, the server A sets the relay servers in which distances between the relay servers are within a fixed value, as a group that is able to be concentrated on one relay server. The server A calculates a relay server nearest to an intermediate point between the relay servers positioned before and after the group on the main route. The server A then concentrates the other relay servers within the group on the calculated relay server so that the relay server settings to the concentrated relay servers are released.

(Changing a Transmission Destination)

For example, the transmission source server is able to reset a route when the transmission destination is changed.

For example, when the changed transmission destination is a VM in a new server, the transmission source server finds a straight line between the transmission source server and a new transmission destination server based on a previously existing route, and finds a relay server according to the method described in the first embodiment. When the found relay server is near the existing relay server, the transmission source server then optimizes the relay servers as described above so that the relay servers are concentrated. Moreover, when the communication between the existing server and the VM is completed, the transmission source server releases the wireless bandwidth between the existing relay server and the communication destination thereof and finishes the communication.

(System)

Among the processing described in the embodiments, all or some of the processing described as being conducted automatically may be conducted manually. Conversely, all or some of the processing described as being conducted manually may be conducted automatically using known methods. The procedures, the control procedures, the specific names, and information including various kinds of data and parameters that have been described in the specification and illustrated in the drawings may be altered, unless specified in particular.

The constituent elements of the illustrated devices are functional and conceptual perspectives and do not have to be configured physically as illustrated. That is, the decentralization and integration of the components are not limited to those illustrated in the drawings. That is, all or some of the components may be functionally or physically decentralized or integrated according to each kind of load and usage. All or a part of the processing functionality implemented by the components may be performed by a CPU and a program that is analyzed and executed by the CPU, or may be implemented as hardware with wired logic.

For example, while the embodiments describe an example in which the virtual control unit 40 includes the device information DB 41, the collecting unit 42, the calculating unit 43, the specifying unit 44, the selecting unit 45, the notifying unit 46, the data transmitting unit 47, the bandwidth information DB 60, the collecting unit 61, and the bandwidth adjusting unit 62, the embodiments are not limited as such. For example, a virtual machine may include the device information DB 41, the collecting unit 42, the calculating unit 43, the specifying unit 44, the selecting unit 45, the notifying unit 46, the data transmitting unit 47, a bandwidth information DB 60, a collecting unit 61, and a bandwidth adjusting unit 62.

(Hardware)

Figure 13:
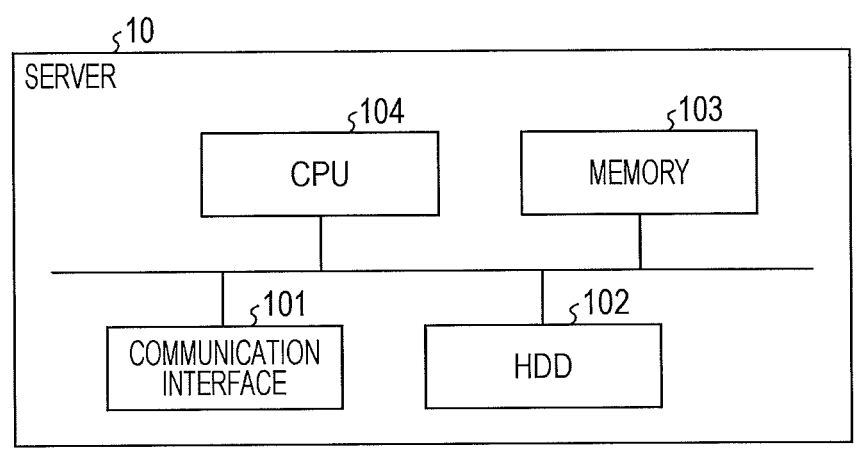
FIG. 13 is a diagram illustrating an example of a hardware configuration, according to an embodiment.

FIG. 13 is a diagram illustrating an example of a hardware configuration, according to an embodiment. As illustrated in FIG. 13, the server 10 includes a communication interface 101, a hard disk drive (HDD) 102, a memory 103, and a CPU 104. The components illustrated in FIG. 13 are interconnected with a bus.

The communication interface 101 is, for example, a wireless interface. The HDD 102 stores tables and programs for activating the functions described in FIG. 2 or FIG. 7.

The CPU 104 activates processes for executing the functions described in FIG. 2 or FIG. 7 by reading programs for executing processes that are the same as the processing units illustrated in FIG. 2 or FIG. 7 from the HDD 102 and storing the programs in the memory 103.

That is, the processes execute functions that are the same as the processing units contained in the server 10. Specifically, the CPU 104 reads programs from the HDD 102 that have the same functions as the collecting unit 42, the calculating unit 43, the specifying unit 44, the selecting unit 45, the notifying unit 46, the data transmitting unit 47, the collecting unit 61, and the bandwidth adjusting unit 62. The CPU 104 then executes the processes that have the same functions as the collecting unit 42, the calculating unit 43, the specifying unit 44, the selecting unit 45, the notifying unit 46, the data transmitting unit 47, the collecting unit 61, and the bandwidth adjusting unit 62.

The abovementioned server 10 operates as an information processor apparatus for executing a method for selecting a server by reading and executing the programs. The server 10 reads the programs from a recording medium with a medium reading device and realizes the functions that are the same as the above embodiments by executing the read programs.

Programs of the other embodiments are not limited to ones executed by the server 10. For example, the embodiments may be applied in the same way when another computer or server executes a program or when another computer and server work together to execute a program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   receiving, from a management server device, three-dimensional disposition information pertaining to positions of a plurality of server devices each including a wireless communication unit;
   converting the three-dimensional disposition information into two-dimensional disposition information;
   calculating, based on the two-dimensional disposition information, a straight line distance indicating a length of a straight line between a first server device in the plurality of server devices and each of second server devices to which the first server device transmits data; and
   selecting, from among the plurality of server devices, a first relay server device for relaying data between the first server device and the second server devices, based on the calculated straight line distances.

2. The non-transitory, computer-readable recording medium of claim 1, wherein
   the process further includes specifying a first straight line having a straight line distance longest among the calculated straight line distances, based on the calculated straight line distances; and
   in the selecting, the first relay server device is selected from among server devices positioned on the first straight line.

3. The non-transitory, computer-readable recording medium of claim 2, wherein
   in the selecting, for a second straight line different from the first straight line, a concentric circle centered on the first server is used to obtain first and second intersections at which the concentric circle intersects the first and second straight lines, respectively, by progressively increasing a radius of the concentric circle, and a server device positioned at the first intersection at which a distance between the first and second intersections exceeds a threshold is selected as the first relay server.

4. The non-transitory, computer-readable recording medium of claim 1, wherein
   the process further includes obtaining, from the management server device, information on bandwidths being used for a transmission route on the first straight line from the first server device to the first relay server device, and allocating a bandwidth having a low utilization rate to the first relay server device.

5. The non-transitory, computer-readable recording medium of claim 4, wherein
   the allocating includes causing other server devices positioned on the transmission route from the first server device to the first relay server device to suppress a use of the bandwidth allocated to the relay server device.

6. The non-transitory, computer-readable recording medium of claim 2, wherein
   the calculation process includes, when a transmission destination of second data transmitted by a third server device is any one of the second server devices, calculating a third straight line from the third server device to the any one of the second server devices; and
   in the selecting,
   a concentric circle centered on the first server is used to obtain first and second intersections at which the concentric circle intersects the first and third straight lines, respectively, by increasing a radius of the concentric circle in a step-by-step manner,
   a server device positioned at the first intersection at which a distance between the first and third intersections falls below a threshold is selected as a second relay server device for relaying the second data between the third server device and the plurality of server devices, and
   an instruction to relay the first and second data is transmitted to the second relay server device.

7. A method for selecting a node relaying data communication between server devices, the method comprising:
   receiving, from a management server device, three-dimensional disposition information pertaining to positions of a plurality of server devices each including a wireless communication unit;
   converting the three-dimensional disposition information into two-dimensional disposition information;
   calculating, based on the two-dimensional disposition information, a straight line distance indicating a length of a straight line between a first server device in the plurality of server devices and each of second server devices to which the first server device transmits data; and
   selecting, from among the plurality of server devices, a relay server device for relaying data between the first server device and the second server devices, based on the calculated straight line distances.

8. An apparatus for selecting a node relaying data communication between server devices, the apparatus comprising:
   a processor configured:
   to receive, from a management server device, three-dimensional disposition information pertaining to positions of a plurality of server devices each including a wireless communication unit,
   to convert the three-dimensional disposition information into two-dimensional disposition information,
   to calculate, based on the two-dimensional disposition information, a straight line distance indicating a length of a straight line between a first server device in the plurality of server devices and each of second server devices to which the first server device transmits data, and
   to select, from among the plurality of server devices, a relay server device for relaying data between the first server device and the second server devices, based on the calculated straight line distances; and
   a memory coupled to the processor, configured to store the two-dimensional disposition information.

9. The apparatus of claim 8, wherein the processor is further configured to:

specify a first straight line having a straight line distance longest among the calculated straight line distances, based on the calculated straight line distances; and select the relay server device from among server devices positioned on the first straight line.

10. The apparatus of claim 9, wherein the processor is further configured to:

use, for a second straight line different from the first straight line, a concentric circle centered on the first server to obtain first and second intersections at which the concentric circle intersects the first and second straight lines, respectively, by progressively increasing a radius of the concentric circle; and select a server device positioned at the first intersection at which a distance between the first and second intersections exceeds a threshold as the relay server device.

11. The apparatus of claim 8, wherein the processor is further configured to:

obtain, from the management server device, information on bandwidths being used for a transmission route on the first straight line from the first server device to the relay server device, and allocating a bandwidth having a low utilization rate to the relay server device.

12. The apparatus of claim 11, wherein the processor is further configured to:

cause other server devices positioned on the transmission route from the first server device to the relay server device to suppress a use of the bandwidth allocated to the relay server device.

13. The apparatus of claim 9, wherein the processor is further configured to:

when a transmission destination of second data transmitted by a third server device is any one of the second server devices, calculate a third straight line from the third server device to the any one of the second server devices;

use a concentric circle centered on the first server to obtain first and second intersections at which the concentric circle intersects the first and third straight lines, respectively, by increasing a radius of the concentric circle in a step-by-step manner;

select a server device positioned at the first intersection at which a distance between the first and third intersections falls below a threshold as a second relay server device for relaying the second data between the third server device and the plurality of server devices; and transmit an instruction to relay the first and second data to the second relay server device.

14. The method of claim 7, further comprising:

specifying a first straight line having a straight line distance longest among the calculated straight line distances, based on the calculated straight line distances; and selecting the relay server device from among server devices positioned on the first straight line.

15. The method of claim 14, further comprising:

using, for a second straight line different from the first straight line, a concentric circle centered on the first server to obtain first and second intersections at which the concentric circle intersects the first and second straight lines, respectively, by progressively increasing a radius of the concentric circle; and selecting a server device positioned at the first intersection at which a distance between the first and second intersections exceeds a threshold as the relay server device.

16. The method of claim 7, further comprising:

obtaining, from the management server device, information on bandwidths being used for a transmission route on the first straight line from the first server device to the relay server device, and allocating a bandwidth having a low utilization rate to the relay server device.

17. The method of claim 16, further comprising:

causing other server devices positioned on the transmission route from the first server device to the relay server device to suppress a use of the bandwidth allocated to the relay server device.

18. The method of claim 14, further comprising:

when a transmission destination of second data transmitted by a third server device is any one of the second server devices, calculating a third straight line from the third server device to the any one of the second server devices;

using a concentric circle centered on the first server to obtain first and second intersections at which the concentric circle intersects the first and third straight lines, respectively, by increasing a radius of the concentric circle in a step-by-step manner;

selecting a server device positioned at the first intersection at which a distance between the first and third intersections falls below a threshold as a second relay server device for relaying the second data between the third server device and the plurality of server devices; and transmitting an instruction to relay the first and second data to the second relay server device.

* * * * *